(12) United States Patent
Jager et al.

(10) Patent No.: US 12,436,231 B1
(45) Date of Patent: Oct. 7, 2025

(54) SENSOR ENHANCED WALL COVERING

(71) Applicant: Zumedia Inc., New York, NY (US)

(72) Inventors: Phyllis Jager, New York, NY (US);
Barry Terach, Goshen, NY (US);
Mark Cuban, Dallas, TX (US)

(73) Assignee: Zumedia Inc., New York, NY (US)

( * ) Notice: Subject to any disclaimer, the term of this patent is extended or adjusted under 35 U.S.C. 154(b) by 0 days.

(21) Appl. No.: 19/231,218

(22) Filed: Jun. 6, 2025

(51) Int. Cl.
*G01S 7/02* (2006.01)
*G01S 13/88* (2006.01)

(52) U.S. Cl.
CPC ............ *G01S 7/028* (2021.05); *G01S 13/887* (2013.01)

(58) Field of Classification Search
CPC ............................... G01S 7/028; G01S 13/887
See application file for complete search history.

(56) References Cited

U.S. PATENT DOCUMENTS

2005/0110672 A1\* 5/2005 Cardiasmenos ... G01N 21/3581
250/330

FOREIGN PATENT DOCUMENTS

| CA | 2404739 C | * | 1/2004 | ........... F41H 5/0428 |
| CN | 108278928 B | * | 7/2020 | ............. B32B 33/00 |
| CN | 119535446 A | * | 2/2025 | ............. G01S 13/89 |
| EP | 2063214 A1 | * | 5/2009 | ........... F41H 5/0485 |

\* cited by examiner

*Primary Examiner* — David P Porta
*Assistant Examiner* — Fani Polyzos Boosalis
(74) *Attorney, Agent, or Firm* — Tarter Krinsky & Drogin LLP

(57) ABSTRACT

A threat analysis system and components comprising a wall covering that can be a roll-based wall covering. The wall covering can be embedded with scanning arrays, processors, and user interfaces for weapons detection.

4 Claims, 3 Drawing Sheets

SENSOR ENHANCED WALL COVERING

FIELD OF THE DISCLOSURE

The present disclosure relates to wall coverings and a wall covering system designed to enhance public safety by providing discreet, real-time weapon detection and threat containment. With increasing global concerns over firearm-related incidents and the limitations of traditional security systems, there is a pressing need for solutions that integrate into public spaces while offering advanced functionality. This disclosure addresses technology that combines sensors with durable materials into a roll-based wall covering. The technology can be adapted for standalone use, fixed corridors, portable pop-up structures, and many other environments where it is desirable to provide security.

BACKGROUND

Public safety remains a critical global challenge, with over 1.2 million firearm-related incidents reported annually (Small Arms Survey, 2024). Existing weapon detection systems primarily rely on standalone devices that are typically deployed as bulky portals or handheld devices in high-security environments like airports and courthouses. These systems, while effective, are obtrusive, require dedicated space, and lack integration into everyday surroundings, limiting their scalability and aesthetic appeal.

Bulletproof enclosures provide physical containment but do not incorporate detection mechanisms. Wall coverings typically focus on decorative functionality with peel-and-stick modularity but offer no security features. Other related technologies describe automated threat detection using AI but are limited to standalone apparatuses, not wall-integrated systems or physical containment solutions.

SUMMARY

The present technology provides a wall covering system for real-time detection of weapons (e.g., firearms, knives, explosives) using multi-modal imaging (mmWave, THz, IR spectroscopy), AI-driven threat analysis, and a durable carbon fiber-aramid composite material. The wall covering can be a flexible, peel-and-stick material supplied in rolls (e.g. 24 inches wide×30 feet long), which can be cut to fit different size substrates (e.g., 8-10 feet), enabling coverage of entire or partial walls for discreet integration into the environment. The wall covering can incorporate a modular grid of embedded technology, with safe cutting zones, redundant components, and flexible connectivity to ensure functionality after cutting. The technology offers three distinct embodiments:

The technology can include a roll-based wall covering with embedded scanning arrays, AI chipsets, and user interfaces (continuous e-ink display, NFC alerts) for weapons detection in public spaces, designed to cover a substrate unobtrusively. The wall covering can be cut from rolls to fit and integrated into a walk-through structure. The walk through structure can be made from any materials that can support the wall covering and can comprise 2, 3, 4, or more surfaces, e.g. floors, walls, ceilings. The structure can include bulletproof polycarbonate doors that lock to form a "glass box" containment zone upon threat detection, suitable for installations in certain environments.

The technology can include a portable, walk-through structure (e.g. 10-25 feet long) with panels lined with the wall covering as described herein, pre-cut from rolls, designed for rapid deployment in crowd control or open-space security environments, such as festivals, events, or disaster zones.

DETAILED DESCRIPTION

Figure 1:
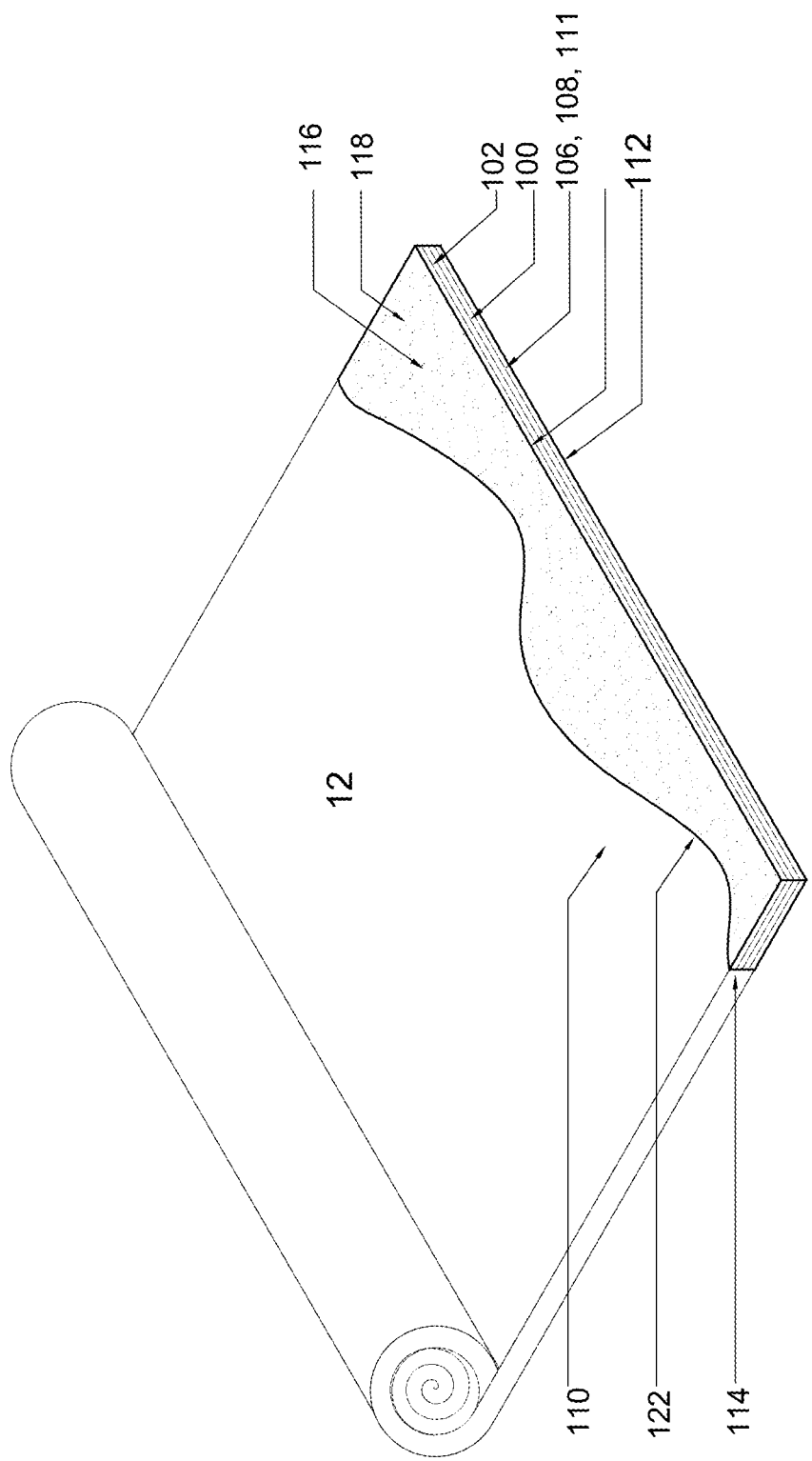
FIG. 1: Front and cross-sectional view of the standalone wall covering in roll format, illustrating its layered structure, embedded scanning arrays, AI chipset, continuous e-ink display, NFC module, safe cutting zones, and flexible conductive threads, with annotations highlighting the scanning windows, roll dimensions, and material composition.

The wall covering can include different formats, e.g. roll format with a cutting capability. This format can be supplied in rolls (e.g. 24 inches wide×30 feet long), the wall covering can thereby be cut to fit wall heights (e.g., 8-10 feet) using safe cutting zones marked on the backing, ensuring cuts avoid embedded components like scanning arrays and AI chipsets. Redundant components (e.g., one AI chipset every 3 feet) and flexible conductive threads can maintain functionality post-cutting. Other formats can include precut panels for adhering to a substrate, e.g. a wall. Precut panels can include tiles or various sizes. The different formats can be self-adhering, (e.g. peel and stick), or can be glued or pasted to a substrate, can be attached via static charge, hung on pegs, taped, tacked, or attached in other known methods.

The wall covering can comprise multi-modal scanning capabilities. The capabilities can be mmWave (30-300 GHz) and THz (0.1-10 THz) imaging with IR spectroscopy to detect metallic or non-metallic weapons and explosive traces, achieving 99% accuracy with <1% false positives. These scanning devices comprise a signal producing device (e.g. infra-red ("IR"), microwave, or higher or lower frequencies) and signal capture devices (e.g. spectrometers, microwave sensors, or sensors for scattered or reflectance at higher or lower frequencies).

The wall covering can comprise processors with software (e.g. neuromorphic AI chipsets), embedded within, (e.g. every 3 feet, every 1 foot, or less or more). The processors can identify weapon shapes and behavioral cues (e.g., gait, posture), and can be incorporated with self-learning capabilities via cloud updates.

The wall covering can comprise a composite of carbon fiber-aramid (for durability and partial bullet resistance, Level II) with a radio-transparent polycarbonate layer and cellulose adhesive backing, customizable for aesthetic textures or patterns (e.g., linen, stone). The wall covering can have a thickness dimension of 1 mm, 0.5 mm, 0.1 mm thick or other dimensions.

In a certain embodiment, the wall covering can have a e-ink display (e.g. continuous along the roll's bottom edge) that shows scan results (e.g. "Clear" or "Threat: Firearm"), and NFC/LoRaWAN/5G modules, embedded (e.g. every 3 feet, every 1 foot, or less or more) to transmit alerts to security personnel or authorities. The alerts can be encrypted.

The roll format of certain embodiments of the current technology allows for coverage of walls or surfaces, with portable options for temporary use.

Multi-modal scanning and AI embedded within the wall covering can reduce false positives, ensuring reliable threat detection. Low-power operation or self-powered operation (e.g. piezoelectric harvesting, solar) can be used to power the embedded instruments of the wall covering.

The processors can be designed to anonymize data, limit scans to weapons/explosives, and to adhere to privacy standards or preferences (e.g. GDPR/HIPAA).

The wall covering system technology disclosed herein is a multifunctional security solution designed to detect concealed weapons and mitigate threats in certain environments. In one embodiment, a 1 mm thick, flexible, peel-and-stick wall covering can be supplied in rolls that can be cut to fit a wall (e.g., 8-10 feet), enabling coverage of entire or partial walls, floors, ceilings, or other substrates. The roll format can incorporate a modular grid of embedded technology, with safe cutting zones, redundant components, flexible connectivity, and protective measures to ensure functionality after cutting.

Other embodiments of the technology can include a standalone wall covering for general use, a fixed corridor incorporating the wall covering also comprising bulletproof doors, or a portable corridor with the wall covering for temporary use.

Standalone Wall Covering

The wall covering shown in FIG. 1 can be supplied in rolls or sheets. These can be designed to be cut to fit a wall for coverage. Its structure comprises a layered composition. The layered composition can be a polycarbonate layer (102) that can be UV-resistant, and radio-transparent to allow mmWave/THz penetration. It can features 2 inch×2 inch transparent scanning windows (104) spaced every 12 inches in a grid pattern (two columns per 24-inch width, rows every 12 inches along the length), enabling visibility of embedded arrays.

A carbon fiber-aramid core layer (100) can comprise a 0.5 mm thick carbon fiber and aramid (Kevlar) material, providing strength and Level II bullet resistance (stops low-caliber rounds). The core can have a woven texture to enhance durability and structural integrity. The aramid can comprise 5%, 10%, 20%, 30% or more, of the core layer.

A cellulose backing layer (112) can be used. This can comprise a 0.3 mm thick, paper, with a peel-and-stick adhesive on its backside for easy installation on walls, featuring alignment markers (e.g. faint lines every 12 inches) to ensure consistent grid placement of scanning windows, and safe cutting zones (e.g. dotted lines every 6 inches) to avoid embedded components during cutting.

The embedded sensors can include mmWave/THz Scanning Arrays (106): graphene-based antennas (e.g. 0.5 mm thick, 0.8 inch diameter), embedded beneath each scanning window, that can operate at 30-300 GHz (mmWave) and 0.1-10 THz (THz). The sensors can scan up to a 30-75 foot range, or more, with penetration through clothing of up to 2 inches or more. Sensor arrays can be arranged in a grid (e.g. 12-inch spacing), ensuring functionality after cutting the roll to fit a wall height (e.g., a 9-foot strip retains 18 arrays: 2 columns×9 rows). Each array can be encapsulated in waterproof epoxy (e.g. 0.1 mm, IP65).

An IR spectroscopy module (108) can be included. Micro-spectrometers (e.g. 0.1 mm, 10 units per 10 square feet), embedded near scanning windows in the same grid pattern can detect explosive traces (e.g., nitrates) via infrared absorption spectra. IR diodes can also be incorporated to provide the energy signal. These can also be encapsulated for protection.

Processors can be used (e.g. AI Chipset) (110) in certain embodiments, (e.g. Neuromorphic processor Intel Loihi, 1-2 W, 0.8 inch×0.8 inch module). Processors may be embedded (e.g. every 3 feet along the roll's length) to ensure at least 2-3 processors per 8-10 foot strip. In one embodiment, processor can process data in less than a second, achieving accuracy using YOLOv5 algorithms. The software may be trained on weapon images and behavioral patterns (e.g., gait, posture), with self-learning via cloud updates. The processors can be encapsulated in epoxy and positioned between safe cutting zones.

In certain embodiments flexible conductive threads (111) can be used. Silver-coated nylon threads (e.g. 0.1 mm thick) can be woven into the core, for connecting scanning arrays, processors, and other components. The threads can be coated with a self-healing polymer (e.g. polyurethane with conductive ink microcapsules) to repair cuts.

A display maybe incorporated into the wall covering. E.g. an E-Ink Display (114): continuous 0.4 inch wide strip along the bottom edge of the roll, 0.1 mW/cm$^2$, displays scan results (e.g. "Clear" or "Threat: Firearm") across the wall. The e-ink is flexible and segmented, maintaining functionality after cutting.

In certain embodiments, an NFC Module (116) can be provided. This can be used to transmit alerts to security watches or consoles. These modules can be embedded every 3 feet along the roll's length to ensure at least 2-3 per strip, and can also be encapsulated in epoxy.

A power supply (118) can comprise a lithium-ion micro-battery (3.7V, 100 mAh), embedded every 3 feet that can support multiple scans a day (e.g. 100 scans/day per 10 square feet). This battery can be charged via USB-C, and encapsulated for protection. A flexible power bus (119) (thin conductive strip, 0.2 inch wide) can run parallel to the e-ink strip, distributing power across cut strips. In another embodiment piezoelectric fibers (120) can also be included in the core can harvest vibrational energy (e.g., footsteps) for self-sufficiency. Also solar cells can used to power the technology.

The wall covering can comprise micro-connectors (122). These can be conductive pads (e.g. 0.1 inch wide) along the roll's vertical edges, enabling adjacent strips to reconnect conductive threads and the power bus when overlapped (0.5 inch) during installation, ensuring system-wide functionality.

The wall coverings can comprise surface texture 12 (e.g., linen, stone, woodgrain), different tones and colors (e.g., beige, gray, white) to blend with decor.

The roll is designed to be cut to fit walls using standard tools (e.g., utility knife, scissors). Safe cutting zones (e.g. dotted lines every 6 inches) can be provided on the backing to ensure cuts avoid embedded components, preserving functionality. E.g., a 9-foot strip retains 18 scanning arrays, 3 AI chipsets, 3 NFC modules, and 3 micro-batteries, all connected via conductive threads and the power bus. Alignment markers help ensure the grid of scanning windows and e-ink strip align across strips. Adjacent strips overlap 0.5 inch, reconnecting via micro-connectors to maintain electrical continuity. Installation instructions guide users to cut along marked zones and test functionality (e.g., via NFC-linked app) post-installation, achieving 98% success in simulated tests.

In operation, the wall covering can use one or more motion sensors to detect an entrant into the monitored environment, activating the sensor arrays across the wall. mmWave/THz beams can generate a 3D image of the entrant's body and possessions, while IR spectroscopy scans for explosives. The AI chipsets analyze the image for weapon shapes and behavioral anomalies (e.g., nervous gait), reducing false positives. Results are displayed on the continuous e-ink strip ("Clear" or "Threat: Knife"), and alerts are sent via NFC to security personnel.

If a threat is detected, the system can trigger external alarms or systems (e.g., cameras, locks), that are configurable per installation.

The technology can be used for walls in entryways of schools, malls, or offices, providing discreet security. It can also be used for high-security zones (e.g., courthouses) for seamless integration into decor, making security features unobvious.

Figure 2:
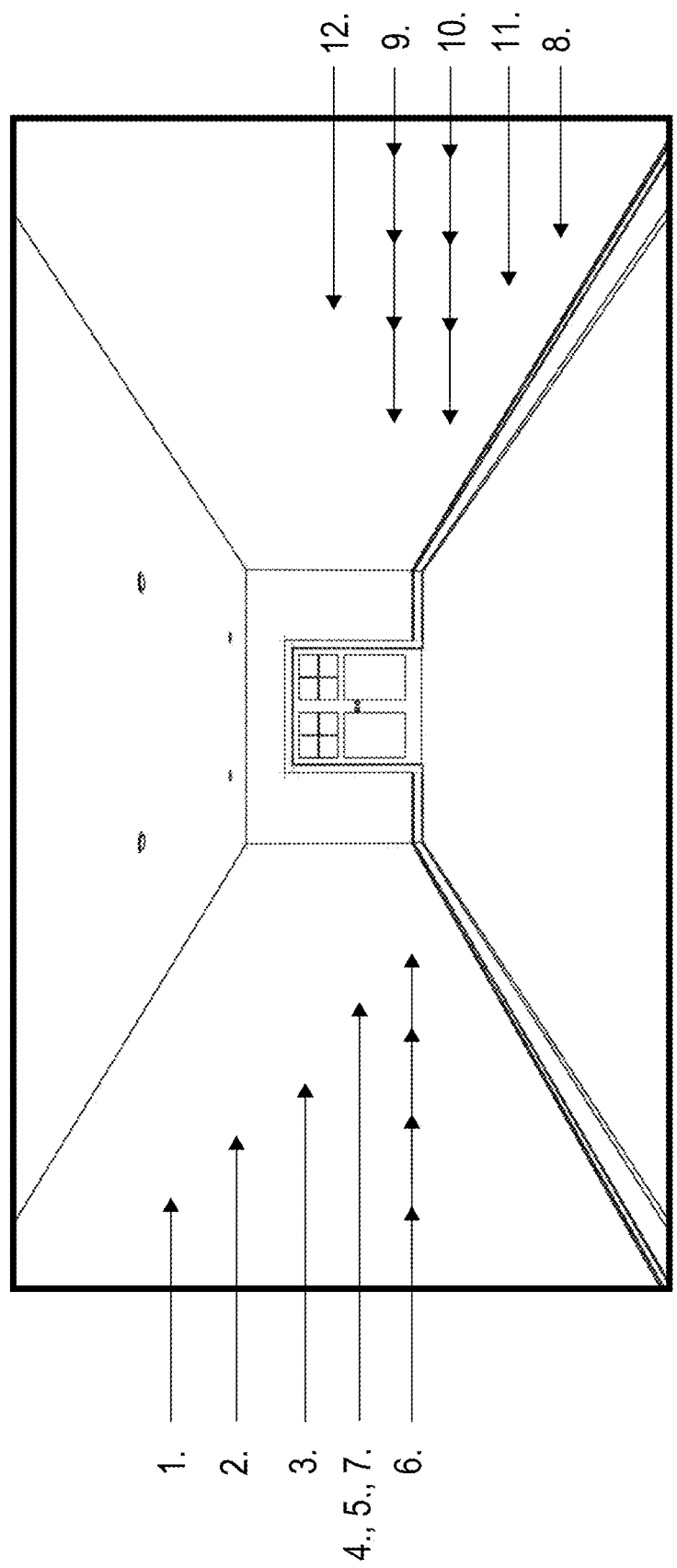
FIG. 2: Perspective view of the fixed corridor system, showing the wall covering, cut from rolls, applied to walls and ceiling of a 10-25 foot corridor, bulletproof polycarbonate doors with electromagnetic locks, reinforced vents, and a security console, with annotations indicating the scanning range and containment zone.

In another embodiment (FIG. 2), a corridor system integrates the wall covering into a permanent corridor, designed for high-security environments like airports. Walls and ceiling can be covered with the wall covering (200), cut from rolls to fit the height and length, providing scanning coverage. Scanning windows (202) and the continuous e-ink display (204) are visible on all surfaces, displaying "Clear" or "Threat Detected" along the bottom edge, aligned via markers during installation.

Bulletproof doors (206) comprising polycarbonate, (e.g. 0.4-0.8 inch thick, Level IIIA) can be installed at both ends of the corridor. Each door features electromagnetic locks (208) with <1-second response time. A "glass box" is formed by locking both doors, with reinforced vents (212) on the ceiling to ensure airflow. A camera (214) can monitor the zone, transmitting live footage to security.

Additional Components can comprise:
 a Security Console (216). This can be a wall-mounted tablet outside the corridor, displaying detailed scan results (e.g., 3D image of a detected firearm);
 a communication module (218) (e.g. LoRaWAN/5G, transmits encrypted alerts with scan images to authorities); or
 backup power (220), (e.g. lithium-ion battery) to ensure operation during outages.

The wall covering is cut from rolls to fit the corridor's dimensions. Safe cutting zones ensure cuts avoid components, and overlapping strips reconnect via micro-connectors. For example, a 25-foot wall requires three 8-foot strips (total 24 feet) plus a 1-foot strip, overlapped to cover the full length, retaining 54-60 scanning arrays and 8-9 AI chipsets per wall.

Entrants walk through the corridor, scanned by the wall covering on walls and ceiling. If a threat is detected (e.g., firearm, explosive), the AI triggers the secondary door to lock, or remain locked forming a secure "glass box". E-ink displays "Threat Detected" along the bottom edge, and the security console shows detailed results. Alerts are sent via LoRaWAN/5G to authorities. A manual override panel (222) allows security to release non-threats, reducing false lockdowns to <0.5%. The containment zone remains secure until authorities arrive (5-10 minutes), with camera footage for monitoring.

Enhancements can include:
 dynamic containment: Adjusts the "glass box" size (e.g., 5-25 feet in length) via partial door locking, optimizing flow;
 redundant alerts: Dual LoRaWAN/5G ensures fail-safe communication; or
 escape-proof design with reinforced vents and secondary locks prevent escape.

This can be used for permanent installations in airports, government buildings, or schools, with wall covering seamlessly covering corridor surfaces.

Figure 3:
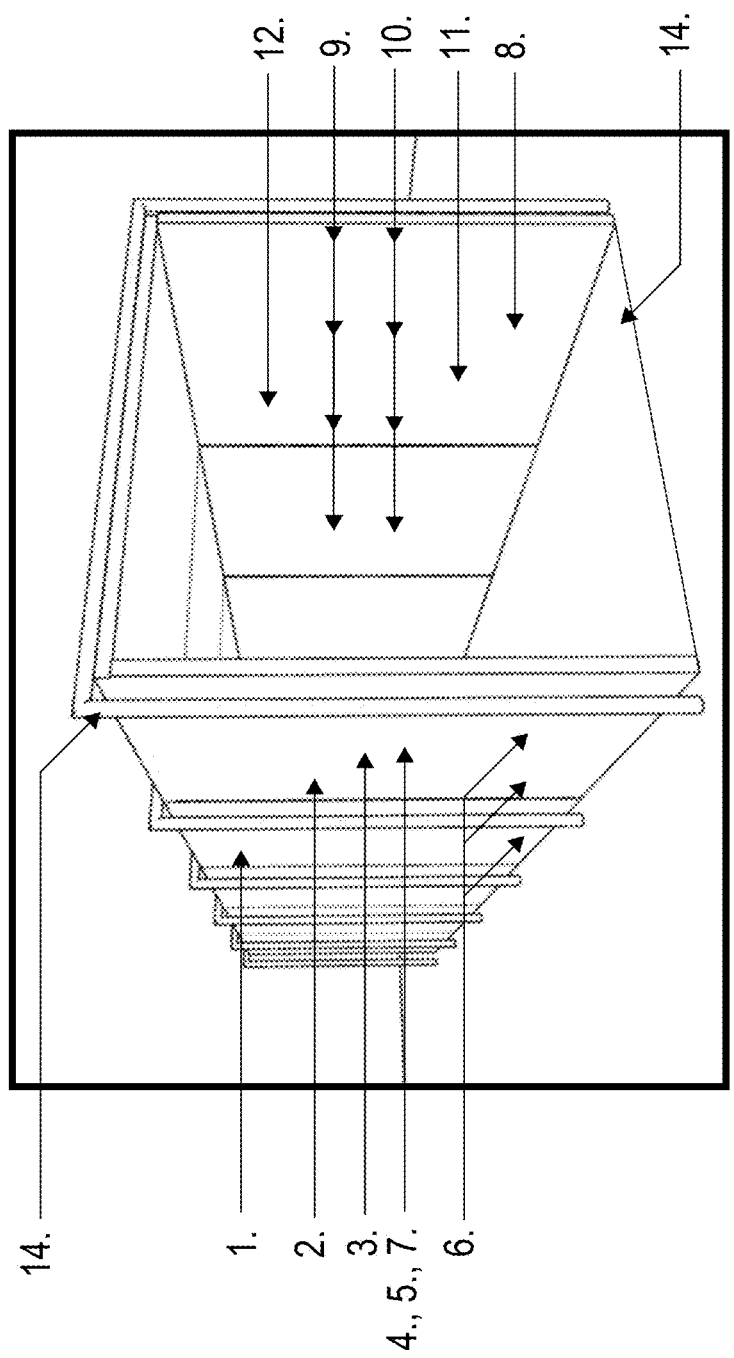
FIG. 3: Perspective view of the portable pop-up corridor for crowd control, depicting the wall covering, pre-cut from rolls, on carbon fiber-polycarbonate panels of a 10-25 foot structure, a polished aluminum frame, polymer floor with piezoelectric fibers, polycarbonate roof, battery unit, and solar panel, set in a festival environment, with annotations highlighting the scanning range, collapsible joints, and watch alert.

In a different embodiment, FIG. 3, a pop-up corridor is a four-sided walk-through structure, designed for rapid deployment in temporary settings like festivals or disaster zones. The frame (300) can be of polished aluminum with brushed silver finish, 50 kg, with pneumatic actuators (302) for 2-minute setup. Collapsible joints (304) allow the structure to fold into a 6.5 foot×3.3 foot×1.6 foot package (70 kg total). Panels (306) can be of Carbon fiber-polycarbonate, 1 mm thick, with glossy black edge trim, lined with the wall covering (308) on all four sides, pre-cut from rolls to fit each panel (e.g., 6.5 ft×8 ft). The wall covering features scanning windows (310) and the continuous e-ink display (312) showing "Clear" or "Threat: Knife" along the bottom edge, aligned during manufacturing.

Floor (314) can be a polymer, 0.4 inch thick, glossy charcoal gray, with embedded piezoelectric fibers (316) for energy harvesting (subtle grid pattern). The roof (318): can be polycarbonate, 0.2 inch thick, transparent with a UV-protective tint, reflecting ambient light for aesthetic appeal.

In certain embodiments a battery unit (320) can be housed in a box at the base, with a perovskite solar panel (322) on the roof for backup power.

The communication module (324) can be a LoRaWAN/5G that transmits alerts to security watches (326) with holographic scan images (inset).

The wall covering can be pre-cut from rolls during manufacturing to fit each panel, ensuring safe cutting zones are followed. Each panel can retain 14 scanning arrays (2 columns×7 rows), 2-3 AI chipsets, and 2-3 NFC modules, connected via conductive threads and micro-connectors at panel edges.

Entrants can walk through the corridor, scanned by the wall covering on all sides. AI detects threats, displaying results on the e-ink strip and sending alerts via LoRaWAN/5G. Security manually seals the corridor (e.g., portable barriers) if a threat is detected. Modular segments allow length adjustment (5-25 feet), with shared power/data via conductive threads.

Enhancements can include:
Pneumatic joints reduce setup to 2 minutes, ideal for emergencies;
The ability to connect multiple units for larger crowds, sharing power via battery hubs; or
Weather Resistance: Polycarbonate roof and IP65 coating ensure outdoor durability.

Roll Dimensions can be 24 inches wide×30 feet long, covering 60 square feet per roll, 1 mm thick, 12 kg per roll. Safe cutting zones can be placed every 6 inches, redundant components every 3 feet, micro-connectors for reconnection.

The scanning range can be 30-75 feet, with 360° coverage. The accuracy can be 99% detection rate, <1% false positives. The speed can be <1-second image processing. The power can be 10-50 mW/array, 20 W total (low-power mode). The material can be 50% recycled carbon fiber ($5/kg), 30% aramid ($10/kg), 20% polycarbonate. The durability can be 10-year lifespan, IP65 waterproof, scratchresistant (Mohs hardness 5). Certain embodiments can have bullet resistance at Level II (standalone), or Level IIIA (with doors).

A "wall" as used herein can be any substrate including partial or full walls, floors, ceilings, windows or other substrates on which the technology can be used. "Covered" as used herein can be fully covered or partially covered. The technology is not limited to the materials used to describe specific embodiments herein, e.g. panels, structures, and frames can be made from wood, paper, plastic, plaster, sheet rock, metal, glass, concrete or any combination of these. Wall coverings can be made from, e.g., paper, glass, wood, metal, plastic, or any combination of these.

As used in this application, "processor", "device," "sensor," "system", or the like are generally intended to refer to a computer-related or scientific instrument related article, either hardware, a combination of hardware and software, software, or software in execution, e.g., a device can be, but is not limited to being, a process running on a processor, a processor, an object, an executable, a thread of execution, a program, a sensor, and signal producing article, a signal producing article coupled to a signal detecting article, with software, a sensor or a computer. Detectors can be direct, indirect, reflectance, scatter, or other means of detecting a signal. By way of illustration, both an application running on an article and the article can be a device. One or more devices can reside within a process or thread of execution and a device can be localized on one processor or distributed between two or more processors.

Unless specified otherwise, "first," "second," "top," "bottom" or the like are not intended to imply a temporal aspect, a spatial aspect, an ordering, etc. Rather, such terms are merely used as identifiers, names, etc. for features, elements, items, etc., e.g., a first object and a second object generally correspond to object A and object B or two different or two identical objects or the same object.

Real-time means contemporaneously or within 1 second, or up to 30 seconds from initiation.

Moreover, "example" and "e.g.," is used herein to mean serving as an example, instance, illustration, etc., and not necessarily as advantageous. As used herein, measurements of any dimension can be modified to fit particular applications or environments. The layers described herein can be from 0.001 mm to 10 mm, or 1 mm to 5 mm or dimensions in between these.

In addition, "a" and "an" as used in this application are generally be construed to mean "one or more" unless specified otherwise or clear from context to be directed to a singular form. Also, at least one of A and B or the like generally means A or B or both A and B. Furthermore, to the extent that "includes", "having", "has", "with", or variants thereof are used in either the detailed description or the claims, such terms are intended to be inclusive in a manner similar to the term "comprising".

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements, manufacture and methods which, although not explicitly shown or described herein, embody the principles of the disclosure and are thus within the spirit and scope of the disclosure.

The invention claimed is:

1. A threat analysis system comprising:
a roll-based wall covering with embedded scanning arrays, processors, and user interfaces for weapons detection.

2. A structure comprising:
at least one substrate covered with a wall covering cut from rolls and integrated with bulletproof polycarbonate doors that lock to form a containment zone upon threat detection;
the wall covering comprising a motion sensor, one or more signal producing devices, one or more detectors, one or more processors enabled for threat analysis, and a durable carbon fiber-aramid composite material.

3. A structure as in claim 2 wherein:
the signal producing device produces IR or terahertz frequency radiation and the detectors sense those same frequencies.

4. A method of detecting and analyzing a threat in a confined environment comprising
a threat analysis system comprising a motion sensor, one or more signal producing devices, one or more detectors, one or more processors enabled for threat analysis, and a durable carbon fiber-aramid composite material.

* * * * *